United States Patent Office 2,999,876
Patented Sept. 12, 1961

2,999,876
VAPOR PHASE SYNTHESIS OF ALLYL CYANIDE
Richard L. Roberts, Milton, and John W. Lynn, Charleston, W. Va., assignors to Union Carbide Corporation, a corporation of New York
No Drawing. Filed Mar. 7, 1958, Ser. No. 719,727
4 Claims. (Cl. 260—465.9)

This invention relates in general to a new and useful process for the preparation of aliphatic nitriles and more particularly to an improved process for the manufacture of allyl cyanide by the vapor phase reaction of allyl chloride with hydrogen cyanide.

Allyl cyanide is a promising intermediate for the preparation of many valuable compounds. Although many methods have been investigated for the preparation of this material, no completely satisfactory process has been found. For example, it is known that allyl cyanide can be produced by a liquid phase reaction of allyl chloride and hydrogen cyanide. However, this method is subject to certain disadvantages, the chief among these being the requirement for an acceptor for the liberated hydrogen chloride. Without such an acceptor, low yields of allyl cyanide are obtained and excessive degradation of the product occurs.

By avoiding the use of expensive and cumbersome liquid phase reaction systems and by eliminating the necessity for a hydrogen chloride acceptor, this invention provides a method for the synthesis of allyl cyanide which is superior to the known methods.

The process of this invention comprises the vapor phase reaction of allyl chloride with hydrogen cyanide over a copper-containing catalyst at a temperature of from about 150° C. to 300° C. and preferably from about 200° C. to 275° C.

A reaction system which may be employed in the practice of this invention consists of a stainless steel tube 2.5 centimeters in inside diameter and 97 centimeters in length, filled to a depth of 70 centimeters with about 350 cubic centimeters of 4 x 8 mesh catalyst and heated by a heated jacket containing Tetralin, or some other heat transferring medium, and held at a constant temperature for each determination. From a chilled vessel, maintained at —12° C. to +15° C., a mixture of from 1.0 to 1.33 moles of allyl chloride and from 1 to 2 moles of hydrogen cyanide is pumped to the top of a 12 cm. preheater section held at from 75° C. to 125° C., and preferably 100° C., whereby the reactants are vaporized into the catalyst section which is maintained at a temperature of from 150° C. to 300° C. and preferably 200° C. to 275° C. Collection of the reaction products may be effected in a chilled vessel maintained at —12° C. to +15° C. with the by-product hydrogen chloride vented to a water scrubber for disposal. Recovery of the products from the crude reaction mixture may be accomplished by simple fractional distillation.

Supported copper catalysts which are suitable for use in the present invention include copper sulfate on Aloxite, the proprietary name for a compound composed of fused aluminum oxide, cuprous chloride on Aloxite, copper aluminum oxide and analogous supported copper salts. Particularly preferred catalysts are cuprous chloride on Aloxite and copper aluminum oxide.

Temperatures employed for the process of this invention are from 150° C. to 300° C. and preferably from 200° C. to 275° C. Below a temperature of 150° C. the rate of reaction is markedly decreased, and above 300° C. it was found that yields of the allyl cyanide diminish quite rapidly. For example, it was discovered that operating the process at 290° C. gave considerably lower yields than when the process was conducted at 275° C. under the same conditions.

In order that those skilled in the art may better understand how the present invention may be carried into effect, the following examples are given by way of illustration and not by way of limitation:

*Example I*

A mixture of 421 grams (5.5 mols) of allyl chloride and 135 grams (5 mols) of hydrogen cyanide was vaporized at a rate of 129 ml. per hour through a preheater (approximately 12 centimeters long and 2.5 centimeters in diameter) packed with Aloxite and held at 100° C. and into a stainless steel tube (approximately 70 centimeters long and 2.5 centimeters in diameter) containing 350 cc. of 4 x 8 mesh copper aluminum oxide catalyst held at 150° C. The reaction product, after standing overnight at ambient temperature, was fractionally distilled to give unreacted starting materials and 58.3 grams of allyl cyanide (17.49 yield at 32.6% efficiency on HCN and 43.5% efficiency on allyl chloride) with the following physical properties: boiling point 115° C., $n$ 30/D 1.4022.

*Example II*

A mixture of 306 grams (4 mols) of allyl chloride and 83 grams (3 mols) of hydrogen cyanide was vaporized at a rate of 60 ml. per hour through a preheater (approximately 12 centimeters long and 2.5 centimeters in diameter) packed with Aloxite and held at 100° C. and into a stainless steel tube (approximately 70 centimeters long and 2.5 centimeters in diameter) containing 350 cc. of 4 x 8 mesh 10% cuprous chloride on Aloxite held at 240° C. The reaction product, after standing overnight at ambient temperature, was fractionally distilled to give unreacted starting materials and 64 grams of allyl cyanide (31.9% yield at 38.6% efficiency on HCN and 35.2% efficiency on allyl chloride) with the following physical properties: boiling point 115° C., $n$ 30/D 1.4022.

*Example III*

A mixture of 306 grams (4 mols) of allyl chloride and 83 grams (3 mols) of hydrogen cyanide was vaporized at a rate of 60 milliliters per hour through a preheater (approximately 12 centimeters long and 2.5 centimeters in diameter) packed with Aloxite and held at 100° C. and into a stainless steel tube (approximately 70 centimeters long and 2.5 centimeters in diameter) containing about 350 cubic centimeters of 4 x 8 mesh 10% cuprous chloride on Aloxite held at 290° C. The reaction product, after standing overnight at ambient temperature, was fractionally distilled to give unreacted starting materials and 19.5% yield of allyl cyanide at 26.2% efficiency on HCN and 20.0% efficiency on allyl chloride with the following physical properties: boiling point 115° C., $n$ 30/D 1.4022.

*Example IV*

A mixture of 306 grams (4 mols) of allyl chloride and 83 grams (3 mols) of hydrogen cyanide was vaporized at a rate of 60 ml. per hour through a preheater (approximately 12 centimeters long and 2.5 centimeters in diameter) packed with Aloxite and held at 100° C. and into a stainless steel tube (approximately 70 centimeters long and 2.5 centimeters in diameter) containing 350 cc. of 4 x 8 mesh 10% copper sulfate on Aloxite catalyst held at 235° C. The reaction product, after standing overnight at ambient temperature, was fractionally distilled to give unreacted starting materials and 36 grams of allyl cyanide (17.9% yield at 38.3% efficiency on HCN and 34.2% efficiency on allyl chloride) with the following physical properties: boiling point 115° C., $n$ 30/D 1.4022.

Unless otherwise indicated, all percentages are by weight as used in this specification.

What is claimed is:

1. A process for the preparation of allyl cyanide which consists of contacting a mixture of hydrogen cyanide and allyl chloride with a supported copper salt catalyst which is a member selected from the group consisting of copper sulfate on fused aluminum oxide, cuprous chloride on fused aluminum oxide and copper aluminum oxide, in the vapor phase at a temperature of 150° C.–300° C.

2. A process for the preparation of allyl cyanide which consists of contacting a mixture of hydrogen cyanide and allyl chloride with a copper aluminum oxide catalyst in the vapor phase at a temperature of 150° C.–300° C.

3. A process for the preparation of allyl cyanide which consists of contacting a mixture of hydrogen cyanide and allyl chloride with a 10% copper sulfate on fused aluminum oxide catalyst in the vapor phase at a temperature of 150° C.–300° C.

4. A process for the preparation of allyl cyanide which consists of contacting a mixture of hydrogen cyanide and allyl chloride with a 10% cuprous chloride on fused aluminum oxide catalyst in the vapor phase at a temperature of 150° C.–300° C.

References Cited in the file of this patent

UNITED STATES PATENTS

| 2,467,373 | Dutcher et al. | Apr. 19, 1949 |

FOREIGN PATENTS

| 534,566 | Canada | Dec. 18, 1956 |
| 534,567 | Canada | Dec. 18, 1956 |

OTHER REFERENCES

Groggins: "Unit Processes in Organic Synthesis," page 875, (Fourth Edition, 1952).